US006624865B2

(12) United States Patent
Edwards

(10) Patent No.: US 6,624,865 B2
(45) Date of Patent: Sep. 23, 2003

(54) ACTIVE MATRIX DEVICE WITH REDUCED POWER CONSUMPTION

(75) Inventor: Martin J. Edwards, Crawley (GB)

(73) Assignee: Koninklijke Philips Electronics N.V., Eindhoven (NL)

(*) Notice: Subject to any disclaimer, the term of this patent is extended or adjusted under 35 U.S.C. 154(b) by 0 days.

(21) Appl. No.: 10/011,998

(22) Filed: Dec. 5, 2001

(65) Prior Publication Data

US 2002/0109649 A1 Aug. 15, 2002

(30) Foreign Application Priority Data

Dec. 15, 2000 (GB) ............................................ 0030592

(51) Int. Cl.[7] ................................................ G02F 1/133
(52) U.S. Cl. ....................................... 349/139; 345/103
(58) Field of Search .......................... 349/139; 345/103, 345/4, 859, 997, 100, 87, 58, 99

(56) References Cited

U.S. PATENT DOCUMENTS 4,630,122 A 12/1986 Morokawa .................. 358/241
5,130,829 A 7/1992 Shannon ...................... 359/59

FOREIGN PATENT DOCUMENTS

| | | | |
|---|---|---|---|
| EP | 0315365 | 5/1989 | ............ G09G/3/36 |
| EP | 0315365 A2 | 5/1989 | ............ G09G/3/36 |
| EP | 0342925 A2 | 11/1989 | ........... G02F/1/133 |
| EP | 0869471 | 10/1998 | ............ G09G/3/36 |
| EP | 0929064 | 7/1999 | ............ G09G/3/36 |
| JP | 01319092 | 12/1989 | ............. G09F/9/30 |

*Primary Examiner*—Toan Ton
*Assistant Examiner*—Thoi V. Duong

(57) ABSTRACT

An active matrix device comprises two or more adjacent sub-matrices (22*a*, 22*b*, 22*c*), each comprising a set of row address conductors (34), a set of column address conductors (32), and control elements disposed at intersections of the row and column address conductors. Each control element has a scan input connected to a row address conductor and a data input connected to a column address conductor. The device is divided into sub-matrices (22*a*, 22*b*, 22*c*) between adjacent row address conductors (34). Simultaneous addressing of the sub-matrices allows the data supply frequency to be reduced, leading to a decrease in overall power consumption.

10 Claims, 2 Drawing Sheets

ACTIVE MATRIX DEVICE WITH REDUCED POWER CONSUMPTION

This invention relates to active matrix devices and more particularly, but not exclusively, to active matrix liquid crystal displays (AMLCDs). It is concerned with reduction of the power consumption of such devices.

Active matrix devices, such as AMLCDs, are used in a wide variety of products, including consumer electronics, computers and communication devices. The structure of an AMLCD is described for example in U.S. Pat. No. 5,130,829 (our ref PHB 33646), the contents of which are incorporated herein as reference material. Active matrix devices are often included in portable products where the minimisation of power consumption is a particularly important consideration.

AMLCDs comprise an array of pixel elements addressed by means of row and column electrodes. The row electrodes are driven with row selection signals, while the column electrodes carry video information. A significant component of the power consumption of an AMLCD is the power required to charge and discharge the columns of the display as the video information is applied to successive rows of pixels. The invention seeks to reduce the power consumed by this process.

The present invention provides an active matrix device comprising two or more adjacent sub-matrices, each comprising a set of row address conductors, a set of column address conductors, and control elements disposed at intersections of the row and column address conductors, each control element having a scan input connected to a row address conductor and a data input connected to a column address conductor, the device including row driving circuitry for applying selection signals to the row address conductors, and column address circuitry for applying data signals to the column address conductors, wherein the device is divided into sub-matrices between adjacent row address conductors, and the row driving circuitry and column address circuitry are adapted to address a control element in two or more sub-matrices simultaneously. The time taken to charge each column address conductor can therefore be increased. This reduces the frequency of the drive waveforms required to drive the device, and therefore the power consumption of the device. In a preferred embodiment, a control element in each of the sub-matrices is addressed simultaneously.

Preferably, the row driving circuitry is adapted to select a row in each sub-matrix simultaneously, and the column address circuitry is operable to apply a data signal simultaneously to a column address conductor of each sub-matrix. The row driving circuitry itself may select individually a row in each sub-matrix simultaneously, or alternatively, a row in one sub-matrix may be connected to a row in each of the other sub-matrices such that the connected rows are simultaneously selectable.

The row driving circuitry may be operable to simultaneously select rows in two adjacent sub-matrices in sequence from the adjacent to the distant edges of both sub-matrices, or vice versa. Rather than addressing the rows in each sub-matrix from top to bottom in turn, it may be advantageous to address the rows in a different sequence. If they are addressed in the same sequence then the last row to be addressed in one sub-matrix will be adjacent to the first row to be addressed in the matrix below it. There will then be a significant difference in the timing of the control element drive waveforms present in these two rows, which in display applications might result in a discontinuity in the visual appearance of the display at the junctions between the matrices. This may be avoided by addressing the first matrix from top to bottom, the second from bottom to top, the third from top to bottom, and so on.

In a preferred embodiment, the column address circuitry comprises a data supply means for each sub-matrix, and column driver means for selectively connecting the column address conductors of each sub-matrix to the respective data supply means to apply the corresponding data signals thereto.

Instead of addressing each column in a sub-matrix in turn, it may be preferable to drive each sub-matrix such that several columns are addressed simultaneously. This may allow the charging time for each column to be increased further, thus reducing the power consumption of the device. For example, each data supply means may be connected to a plurality of parallel data lines. Alternatively, the column driver means may receive data in a digital form and store the data for each column, in a latch for example. A digital to analogue converter may then be used to generate an analogue signal for application to the respective column. In that case, several or all the columns in each sub-matrix could be charged simultaneously.

The column address conductors of at least one sub-matrix may be connected to the respective data supply means via their ends adjacent another sub-matrix. Accordingly, in a device comprising three sub-matrices for example, the column address conductors of the middle sub-matrix are driveable from an edge of the sub-matrix which is adjacent one of the other sub-matrices. Conventionally, the address conductors of an active matrix are connected to driving circuitry at the outer edges of the matrix only. The column address conductors of the at least one sub-matrix may be connected to the respective data supply means by a data supply line which extends between the at least one sub-matrix and an adjacent sub-matrix.

In another embodiment, the data supply lines may be located within the respective sub-matrix, rather than at one edge. In a further preferred arrangement, the data supply lines is/are provided beneath the corresponding sub-matrix, for example, underneath one or more of the rows of control elements. It will be appreciated that the data supply lines could be provided at any vertical position within a sub-matrix, as the connections to the column electrodes may be made at any point along the length of the electrodes.

The column driver means preferably comprises a set of control lines, each control line being connected to a respective switching means in each sub-matrix, each switching means being arranged to connect selectively a column address conductor in each sub-matrix to the respective data supply means. Alternatively, the required control signals may be generated by circuitry within the column address circuitry of each sub-matrix, without requiring the inclusion of additional control lines.

The prior art and an embodiment of the invention will now be described by way of example and with reference to the accompanying schematic drawings, wherein.

Figure 1:
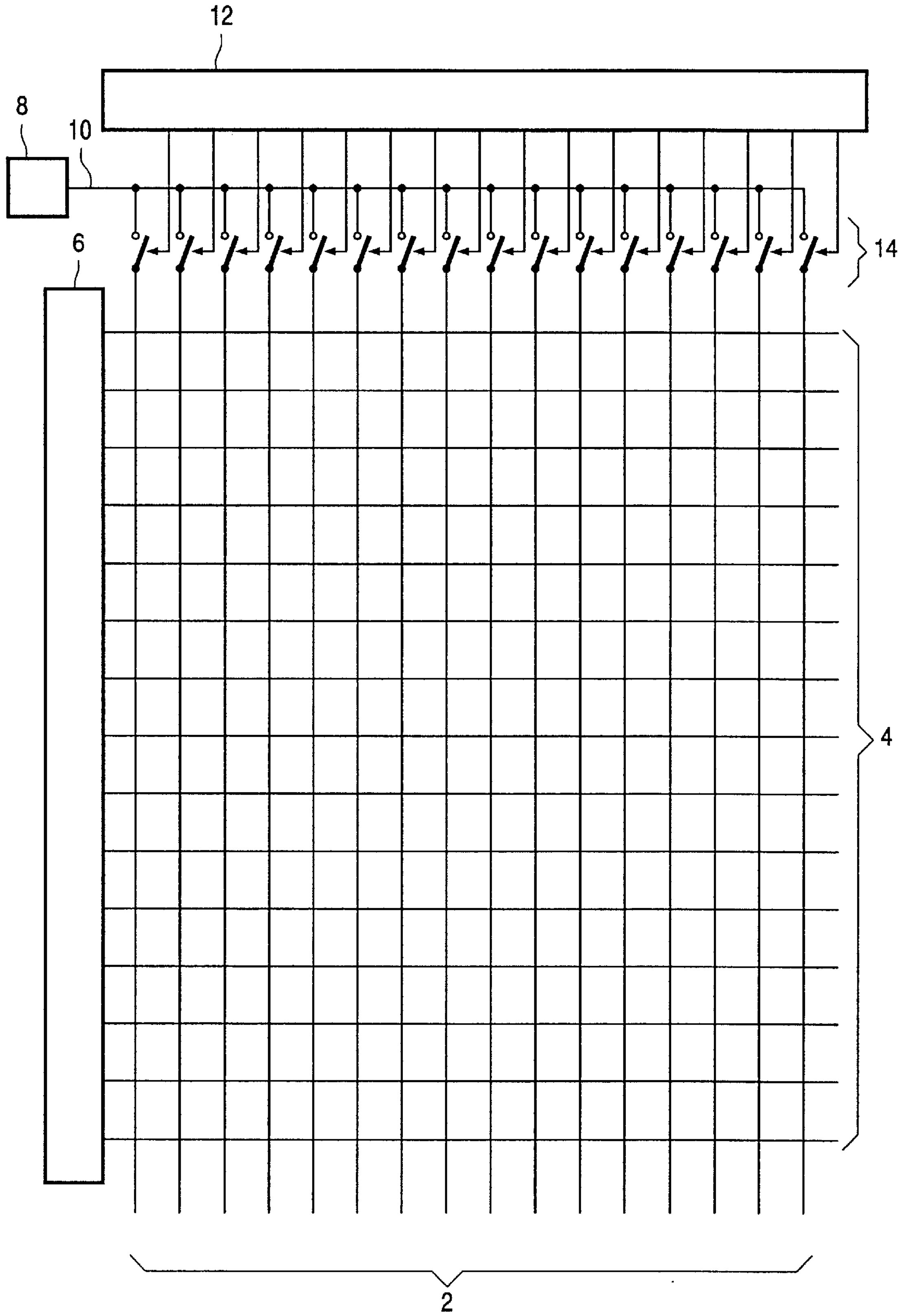
FIG. 1 shows the matrix configuration of a known active matrix device.

FIG. 1 illustrates the matrix configuration of a known active matrix device which employs a simple multiplexing type of integrated column drive circuit. It comprises a set of column address conductors 2 and a set of row address conductors 4. Control elements (not shown) are disposed adjacent the intersections of the conductors and connected to one from each set. In an AMLCD for example, the control elements may be thin film transistors, fabricated using known LAE techniques and may comprise amorphous, microcrystalline or polycrystalline silicon devices. A row driver 6 applies selection signals to the matrix via the row address conductors and data signals are supplied along the column address conductors. The data signals are provided by data supply means 8 along data line 10. Column driver shift register 12 controls normally open switches 14 which are connected between a respective column address conductor and data line 10.

The matrix of FIG. 1 operates as follows. The rows of control elements are selected in turn for a respective row address period upon application of selection signals by the row driver 6 to the appropriate row address conductors 4. In each row address period the data signals for the relevant row are applied to the column address conductors 2. The shift register 12 may operate to close each of the switches 14 in turn to feed the data signals fed along data line 10 to the appropriate column address conductor, with the row selection signal being applied after this has been done. Rather than switch each row on after application of the data signals, the selection signal could however be applied whilst the column switches 14 are being operated. The data signals may be stored on the column capacitance or, alternatively, for example, a dedicated capacitor could be connected to each column address conductor 2 to store the data signal temporarily. The control elements of such an active matrix device are normally addressed on a regular basis, each element being addressed once within the vertical scanning period, $T_F$. The power required to drive the columns of the matrix can be related to certain parameters by the expression below:

$$\text{Power} \propto N_C C_C \frac{N_R}{T_F}$$

in which $N_c$ is the number of column address conductors in the display, $C_C$ is the capacitance of one column address conductor, and $N_R$ is the number of row address conductors.

The applicants have determined that division of the columns into a number, $N_S$, of separate sections, which may be addressed simultaneously, can significantly reduce the power consumption of the device.

For example, if the columns are divided into sections of equal length, the capacitance of each section will be $C_C/N_S$. If the sections of the display corresponding to the separate sections of the column are addressed simultaneously, the frequency with which the data should be applied to the column sections is reduced by a factor of $1/N_S$. The number of column sections is now $N_S N_C$. Modifying the expression given above for a conventional matrix to reflect these changes gives:

$$\text{Power} \propto (N_S N_C)(C_C / N_S)\frac{N_R}{N_S T_F}$$

Simplifying this expression yields:

$$\text{Power} \propto N_C C_C \frac{N_R}{N_S T_F}$$

It can therefore be seen that dividing the column address conductors into $N_S$ sections reduces the power required to charge the column electrodes by a factor of $N_S$.

Figure 2:
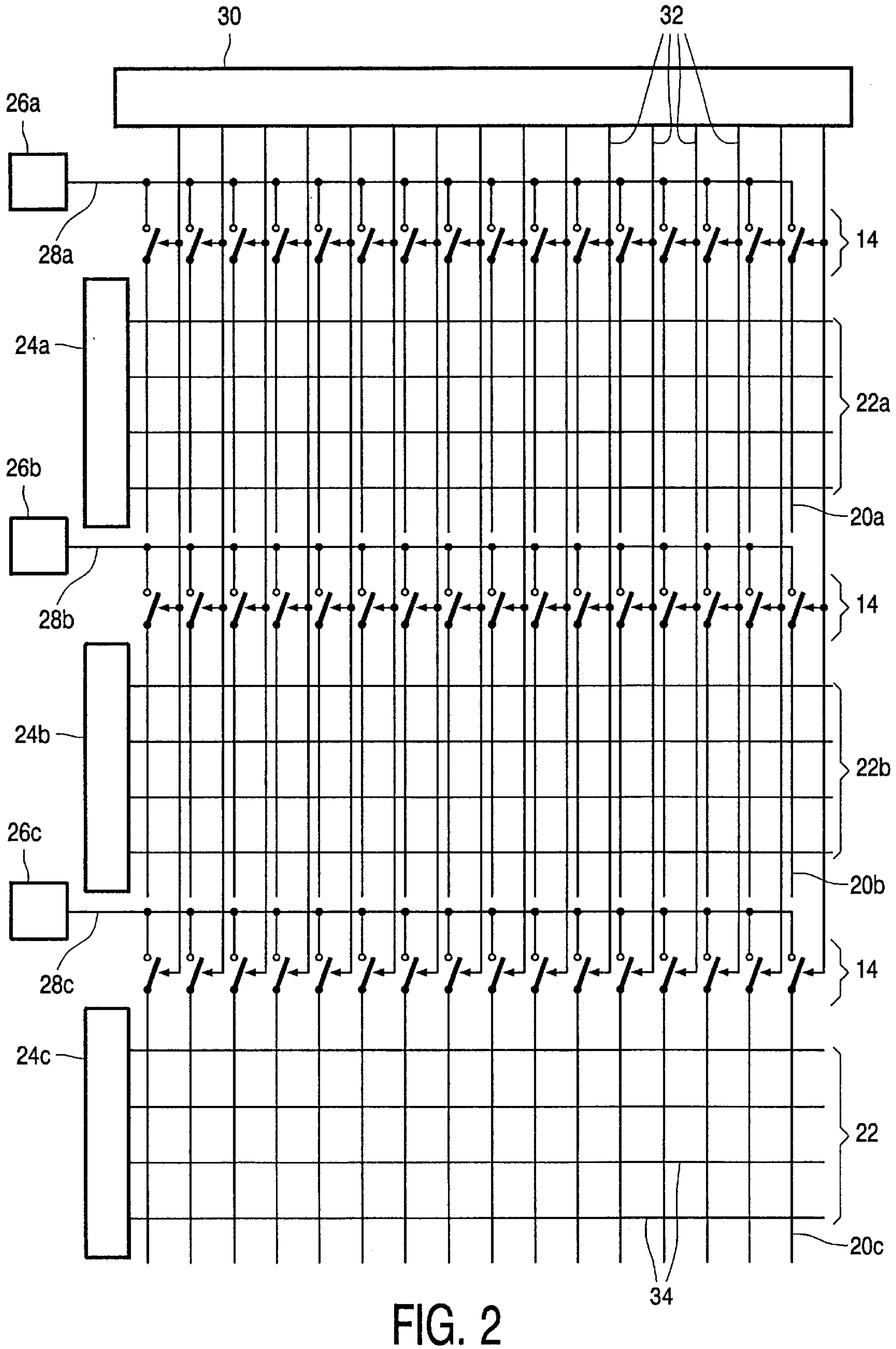
FIG. 2 shows the matrix configuration of an active matrix device in accordance with the invention.

A matrix configuration which implements this concept is shown in FIG. 2. In this example, the column address conductors have each been divided into three separately addressable column sections 20*a,* 20*b* and 20*c,* forming three sub-matrices 22*a,* 22*b* and 22*c.* The drive circuitry is reconfigured to allow for this change. Each sub-matrix has an associated row driver 24*a,* 24*b* or 24*c,* respectively, for driving its row address conductors 34. Data is fed to each sub-matrix from a corresponding data supply means 26*a,* 26*b* or 26*c* along a data line 28*a,* 28*b* or 28*c.* Three sets of switches 14 are therefore provided for connecting each data line to the column conductors of the respective sub-matrix. Column driver shift register 30 controls all three sets of switches via control lines 32. The control signals for operating the multiplexing switches can be the same for the three sub-matrices. In the configuration shown in FIG. 2, these control lines 32 do not extend beyond the switches 14 at the upper end of the third sub-matrix 22*c.* It may be preferable in practice for the lines to continue into the third sub-matrix 22*c* in order to equalise the structure of the matrix. For example, in display applications, such extension of the lines across the full height of the display may be appropriate to ensure that capacitive effects of the lines are the same in each sub-matrix.

The control lines 32 of FIG. 2 may require some additional power relative to the configuration of FIG. 1. However, the amount of power required to drive these lines decreases as the number of sub-matrices, $N_S$, increases. This is because the number of times that the switches 14 need to be operated within each vertical scanning period decreases by a factor of $N_S$.

The matrix of FIG. 2 is preferably driven such that each sub-matrix 22*a* to *c* is addressed at the same time. Thus, the first row of each sub-matrix is addressed simultaneously, and the same applies to each successive row as they are addressed in turn in each sub-matrix. In this way, as noted above, the time taken to apply a signal to each control element may be increased relative to the existing configuration of FIG. 1, as the whole vertical scanning period can be used to drive each sub-matrix, leading to a reduction in overall power consumption.

Although most of the row and column drive circuitry illustrated in FIG. 2 (the switches 14, row drivers 24*a* to *c,* data supply means 26*a* to *c* and column driver shift register 30) is shown to be located to the side of the sub-matrices, it may be advantageous to integrate some or all of this circuitry within the area of the sub-matrices. This can reduce the amount of the peripheral area of the matrix which is occupied by drive circuitry, and hence the overall size of the device.

Memory circuitry may be integrated within the pixels to provide a low power mode of operation. In these displays, the video data transferred to the pixels may be in a digital form rather than analogue.

From reading the present disclosure, other variations and modifications will be apparent to persons skilled in the art. Such variations and modifications may involve equivalent and other features which are already known in the design, manufacture and use of active matrix devices, which may be used instead of or in addition to features already described herein. AlthoughClaims have been formulated in this Application to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any Claim and whether or not it mitigates any or all of the same technical problems as does the present invention. The Applicants hereby give notice that new Claims may be formulated to such features and/or combinations of such features during the prosecution of the present Application or of any further Application derived therefrom.

What is claimed is:

1. An active matrix device comprising:

two or more adjacent sub-matrices, each comprising a set of row address conductors, a set of column address conductors, and control elements disposed at intersections of the row and column address conductors, each control element having a scan input connected to a row address conductor and a data input connected to a column address conductor;

row driving circuitry that is adapted to apply selection signals to the row address conductors; and column address circuitry that is adapted to selectively apply data signals to the column address conductors, wherein the device is divided into the sub-matrices between adjacent row address conductors, and the row driving circuitry and column address circuitry are adapted to address a control element in two or more sub-matrices simultaneously, and a row address conductor in one sub-matrix is connected to a row address conductor in each of the other sub-matrices such that the connected row address conductors are simultaneously selectable, wherein the column address circuitry comprises a data supply means for each sub-matrix, and column driver means for selectively connecting the column address conductors of each sub-matrix to the respective data supply means to apply the corresponding data signals thereto, and wherein the column address conductors of the at least one sub-matrix are connected to the respective data supply means by a data supply line, which extends between the at least one sub-matrix and an adjacent sub-matrix.

2. An active matrix device of claim 1, wherein the column address conductors of at least one sub-matrix are connected to the respective data supply means via their ends adjacent another sub-matrix.

3. An active matrix device of claim 1, wherein the column driver means comprises a set of control lines, each control line being connected to a respective switching means in each sub-matrix, each switching means being arranged to connect selectively a column address conductor in each sub-matrix to the respective data supply means.

4. An active matrix device of claim 1, wherein each sub-matrix has the same number of row address conductors.

5. An active matrix device of claim 1, comprising three or more sub-matrices.

6. An active matrix device comprising:

two or more adjacent sub-matrices, each comprising a set of row address conductors, a set of column address conductors, and control elements disposed at intersections of the row and column address conductors, each control element having a scan input connected to a row address conductor and a data input connected to a column address conductor;

row driving circuitry that is adapted to apply selection signals to the row address conductors; and column address circuitry that is adapted to selectively apply data signals to the column address conductors, wherein the device is divided into the sub-matrices between adjacent row address conductors, and the row driving circuitry and column address circuitry are adapted to address a control element in two or more sub-matrices simultaneously, and wherein the row driving circuitry is adapted to select a row address conductor in each sub-matrix simultaneously, and the column address circuitry is operable to apply a data signal simultaneously to a column address conductor of each sub-matrix, wherein the column address circuitry comprises a data supply means for each sub-matrix, and column driver means for selectively connecting the column address conductors of each sub-matrix to the respective data supply means to apply the corresponding data signals thereto, and wherein the column address conductors of the at least one sub-matrix are connected to the respective data supply means by a data supply line, which extends between the at least one sub-matrix and an adjacent sub-matrix.

7. An active matrix device of claim 6, wherein the column address conductors of at least one sub-matrix are connected to the respective data supply means via their ends adjacent another sub-matrix.

8. An active matrix device of claim 6, wherein the column driver means comprises a set of control lines, each control line being connected to a respective switch in each sub-matrix, each switch being arranged to connect selectively a column address conductor in each sub-matrix to the respective data supply means.

9. An active matrix device of claim 6, wherein each sub-matrix has the same number of row address conductors.

10. An active matrix device of claim 6, comprising three or more sub-matrices.

* * * * *